Sept. 30, 1969     L. S. SUOZZO     3,469,833
HYDRAULIC SHOCK AND SWAY ARRESTOR
Filed March 27, 1967     2 Sheets-Sheet 1
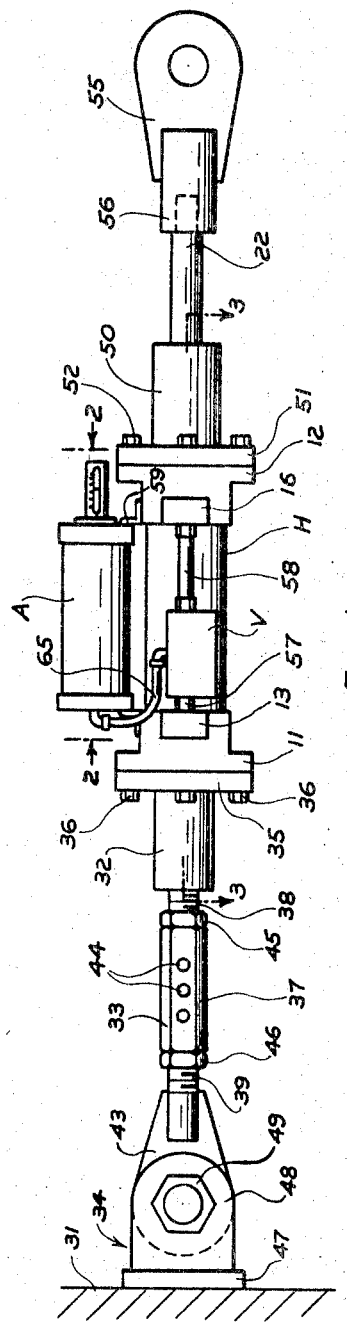
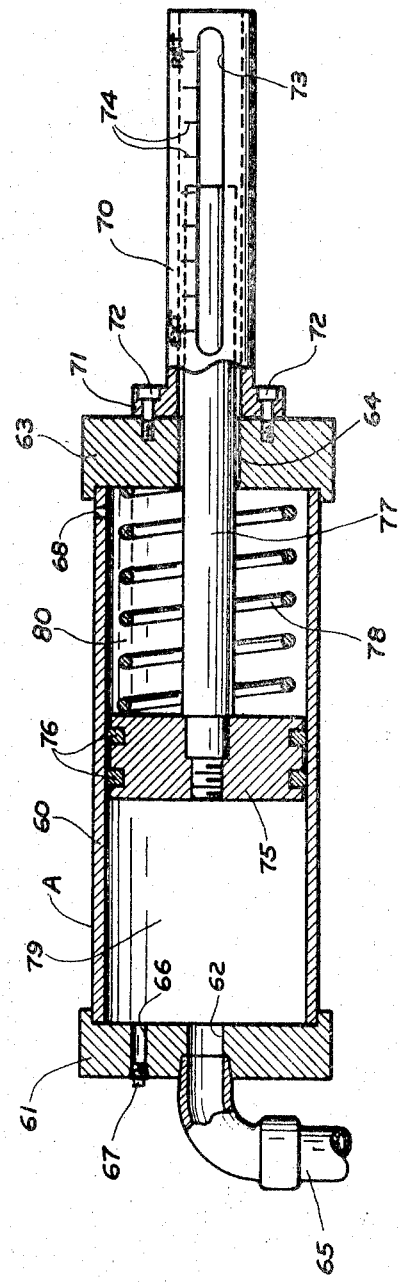
INVENTOR.
LEONARD S. SUOZZO
BY
ATTORNEY Sept. 30, 1969   L. S. SUOZZO   3,469,833
HYDRAULIC SHOCK AND SWAY ARRESTOR
Filed March 27, 1967   2 Sheets-Sheet 2

INVENTOR
LEONARD S. SUOZZO
BY
*F. J. Picarro*
ATTORNEY

United States Patent Office 3,469,833
Patented Sept. 30, 1969

3,469,833
HYDRAULIC SHOCK AND SWAY ARRESTOR
Leonard S. Suozzo, 366 Maple Hill Drive,
Hackensack, N.J. 07601
Filed Mar. 27, 1967, Ser. No. 626,185
Int. Cl. F16f 9/00; F16d 57/00
U.S. Cl. 267—69
10 Claims

ABSTRACT OF THE DISCLOSURE

An arrangement of hydraulically operated control apparatus, which is anchored to a stationary support and is connected to equipment, such as high temperature piping, for protecting the equipment against shock loading or undesirable vibratory movement while permitting normal movement of the equipment due to changes in temperature conditions.

BACKGROUND OF THE INVENTION

This invention relates to a hydraulic shock and sway arrestor and, more specifically, to hydraulic apparatus for protecting piping or equipment which may be subjected to shock loading, swaying, vibratory movement or other similar undesirable conditions during normal use.

The hydraulic shock and sway arrestor of this invention (hereinafter also referred to by the shortened designation "arrestor") constitutes, in effect, a structural device which is so constructed and arranged as to accommodate normal thermal movement of piping or equipment. Thus, the arrestor permits the piping or equipment to move freely and unrestrictedly through its normal operating range. However, and in the event the piping or equipment is subjected to a sudden shock or other displacement force of predetermined magnitude, the arrestor becomes a rigid strut and transfers such force to a stationary structure, such as a building, at the instant the shock force occurs.

The arrestor of this invention has numerous and varied applications including, without limitation: arresting movement of piping or equipment against undesirable sway and vibration forces, such as those caused by earthquakes; preventing possible damage to outdoor equipment installations due to wind conditions; and protecting piping systems from damage from shock loadings, such as those created by quick closing valves, water hammer, relief valve reaction or other possible causes.

SUMMARY OF THE INVENTION

The subject arrestor comprises three interconnected and cooperatively arranged basic units, namely a hydraulic unit, a valve unit and an accumulator unit. The hydraulic unit includes a cylinder, a piston, which is reciprocable in the cylinder and which is acted upon by a suitable hydraulic fluid, and a piston rod which is connected to the piston and extends through a wall of the cylinder. The valve unit is preferably of the poppet valve type and is so constructed and arranged as to control the flow of hydraulic fluid to and from the hydraulic unit. The accumulator unit serves, among other things, as a reservoir for a supply of the hydraulic fluid.

One of the features of this invention resides in the provision of a combined piston rod support and alignment guide means which is external of the hydraulic cylinder and spaced from the cylinder gland for the piston rod. This means includes a sleeve bushing and a wiping collar to render the piston rod self-cleaning as it enters the main cylinder gland. The piston rod support and guide means serves the dual functions of (1) preventing objectionable bending of the piston rod, particularly in the case of long piston strokes, which bending frequently results in premature wear, distortion and enlargement of the gland with consequent leakage, and (2) maintaining a critical portion of the piston rod clean and preventing dust, dirt or other foreign matter from entering the main gland, thereby minimizing maintenance costs and prolonging the useful life of the indicated parts. This feature is most important, especially in installations where the arrestor is not readily accessible for purposes of maintenance and repair.

Another feature of the invention is the provision, in association with the accumulator unit, of a novel and simple fluid gauge for effectively indicating the quantity of hydraulic fluid in the arrestor. As will be evident from the drawings and the detailed description that follows, the gauge device is adapted to function accurately and dependably regardless of the position of the accumulator unit in installed condition.

The primary object of this invention is to provide a hydraulic shock and sway arrestor of the character indicated having improved features of design and construction.

The invention has for another object the provision of an arrestor of the type indicated that is simple and compact in design; that is sturdy and durable in construction; that is reasonable in manufacturing and installation costs; that is low in maintenance costs; and that is capable of performing its intended functions in an efficient and dependable manner over extended time periods.

The enumerated objects and features and additional objects and features, together with the advantage of the invention, will be readily apparent to persons trained in the art from the following detailed description and the accompanying drawings which respectively describe and illustrate a preferred and recommended embodiment of an arrestor constructed according to this invention.

BRIEF DESCRIPTION OF THE DRAWINGS

In the drawings, wherein like reference characters denote corresponding parts in the several views:

FIG. 1 is a view in side elevation of the arrestor;

FIG. 2 is a view in enlargement taken along line 2—2 of FIG. 1, illustrating details of construction of the accumulator unit and the therewith associated fluid gauge;

DESCRIPTION OF THE PREFERRED EMBODIMENT

As was stated earlier, the arrestor of this invention comprises three basic units, namely a hydraulic unit H a valve unit V and an accumulator unit A which are illustrated in assembled relationship in FIG. 1. The hydraulic unit is adapted to be interposed between and operatively connected to a stationary structure and a section of piping or equipment, as will be described presently.

Figure 3:
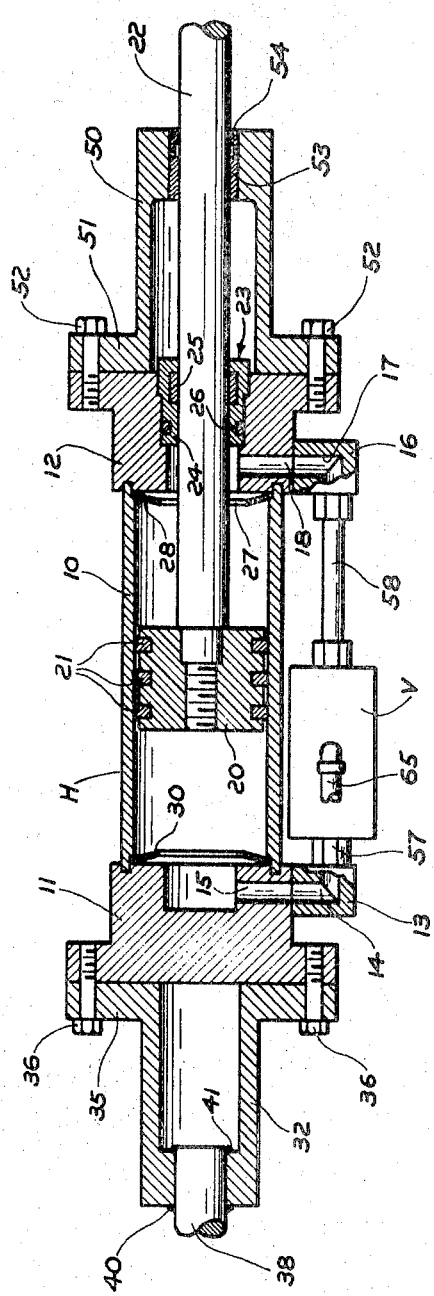
FIG. 3 is a view in enlargement taken along line 3—3 of FIG. 1, illustrating details of construction of the hydraulic unit and the piston rod support and guide means; and, FIG. 4 is a diagrammatic representation of the arrestor which is shown in detail in the other views.
Figure 4:
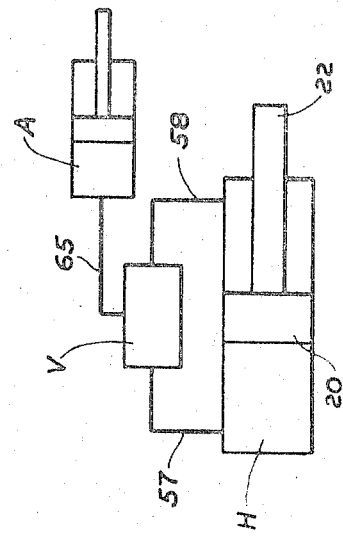

Hydraulic unit H is best shown in FIG. 3 and comprises a cylinder having a tubular side wall 10 and a pair of end walls 11 and 12. A block 13 is secured to end wall 11 and is provided with a port 14 that communicates with one end of the cylinder by way of a passage 15 in end wall 11. A like lock 16 is secured to end wall 12 and is provided with a port 17 that communicates with the other end of the cylinder by way of a passage 18 in end wall 12. Reciprocable in the cylinder is a piston 20 having piston rings 21 and provided with a piston rod 22. Positioned in end wall 12 is a combined bearing and gland 23 which consists of a bearing sleeve 24 of a suitable low-friction material, such as bronze, an inner sealing ring 25 and an outer sealing ring 26.

The piston rod extends through a central opening 27 in a Belleville type disc spring 28 which is disposed adjacent the inner end of end wall 12. A like disc spring 30 is positioned adjacent the inner end of end wall 11. These springs constitute bumper stops at each end of the cylinder for piston 20 and afford added protection of the equipment against piston impact in the event of insufficient hydraulic fluid, malfunctioning of valving or the like.

The hydraulic unit is connected to a building structural member or other stationary support 31 by devices that will now be described. Such devices comprise a first tubular extension or strut 32, a turnbuckle unit 33 and a bracket 34. The tubular extension 32 is provided with an outer flange 35 that is affixed to cylinder end wall 11 by screws 36. The turnbuckle unit includes an internally threaded sleeve 37 and a pair of threaded rods 38 and 39 which engage opposite ends of the sleeve. Rod 38 projects into extension 32 and is secured thereto by weldments 40 and 41 (FIG. 3). A plate 43 is attached, preferably by welding, to the end of rod 39 which is remote from sleeve 37. The sleeve is formed with openings 44 to receive a suitable tool to effect turning of the sleeve relative to rods 38 and 39 and to thereby adjust the effective length of the arrestor, as required. Rods 38 and 39 are provided with nuts 45 and 46, respectively, which engage the ends of sleeve 37 and lock the indicated parts in adjusted position.

Bracket 34 consists of a base plate 47, which is secured to stationary support 31 by bolts or the like (not shown), and a pair of spaced parallel arms 48 which are normal to the base plate. Only one such arm is shown in the drawings. A bolt 49 extends through bracket plates 48 and plate 43 and forms a pivotal connection between these parts. It will be appreciated that plates 43 and 48 may be coupled by other types of connections, such as a universal joint.

The hydraulic unit is provided with a second tubular extension or strut 50 which is coaxial with piston rod 22 and which is formed at one end with an external flange 51 for connection to cylinder end wall 12 by means of screws 52. The other end of this extension is equipped with a bearing sleeve 53 and a flexible outer seal or collar 54 which are retained in the illustrated position in any desired manner known to the art. It will be observed that bearing sleeve 53 and collar 54 respectively support shaft 22 at a location remote from gland 23 and impart a wiping action to the piston rod during reciprocation, whereby to maintain a critical portion of the rod in clean condition. These elements and associated structure represent the support and guide means feature which was discussed earlier herein.

The outer end of the piston rod is joined to a connector plate 55 through the intermediary of a block 56 (FIG. 1), preferably by welding. Connector plate 55 is adapted to be coupled to piping or other equipment of the character indicated (not shown).

Valve unit V is a known device for controlling flow of hydraulic fluid to and from the ends of the hydraulic cylinder by way of a first conduit 57 which communicates with port 14 and a second conduit 58 which communicates with port 17. This unit includes suitable valves (not shown) which remain open to permit free flow of the hydraulic fluid to opposite sides of piston 20 and unrestricted movement of the piston in either direction, for all piston velocities up to a predetermined value. The parts of the valve unit are so constructed and arranged that its valves are automatically closed at the instant the piston velocity in either direction exceeds such predetermined value, thereby terminating the referred-to flow of the hydraulic fluid and movement of the piston. This converts the hydraulic unit H into a rigid strut or restraint.

The valve unit may be of any suitable construction known to the art. A preferred and recommended type of construction is one employing poppet valves and manufactured and marketed in this country by Hanna Company, Chicago, Ill.

Accumulator unit A serves several functions, including that of a reservoir for containing a supply of the hydraulic fluid, preferably a suitable grade of oil, for the valve unit V and hydraulic unit H. The accumulator unit is mounted on the hydraulic unit by brackets 59.

The accumulator unit, as best shown in FIG. 2, comprises a cylinder 60 including an end wall 61 having a through passage 62 and an end wall 63 having central through opening 64. A conduit 65 establishes communication between the valve unit and passage 62. Cylinder wall 61 has a tapped opening 66 for admission of the hydraulic fluid. This opening is provided with a removable plug 67. Cylinder 60 has an air breather port 68.

The illustrated arrestor also includes a fluid gauge for visually indicating the amount of hydraulic fluid in the accumulator unit and, therefore, in the fluid system constituted by the accumulator unit, the valve unit and the hydraulic unit. The fluid gauge includes a tubular member 70 having an outer flange 71 which bears against cylinder wall 63 and is attached thereto by screws 72. This tubular member has an elongated slot 73 and is provided with a scale having a series of graduations 74. A piston 75 is slidable in cylinder 60 and carries rings 76 and a rod 77 which extends through cylinder opening 64 and terminates in tubular member 70. Positioned within cylinder 60 is a helical compression spring 78 which bears at its ends against piston 75 and cylinder end wall 63 whereby to normally and yieldingly urge the piston and its rod toward the left, as viewed in FIG. 2. The piston 75 divides cylinder 60 into a hydraulic fluid compartment 79 and an air compartment 80 which is maintained at atmospheric pressure by virtue of breather port 68. The relative position of piston 75 and its rod 77 in cylinder 60 is determined by the quantity of the hydraulic fluid in compartment 79. The size of compartment 79 varies directly with the amount of the hydraulic fluid therein at a particular time. This is reflected by the position of piston 75 and rod 77. Thus, it will be evident that the free end of rod 77 cooperates with graduations 74 to indicate visually the amount of hydraulic fluid in compartment 79 and, therefore, in the fluid system. Rod 77 and the portion of tubular extension 70 having the graduations are preferably of contrasting colors to permit of ready reading of the fluid gauge. For example, the tubular extension may be light green and the rod bright red in color.

For the purpose of outlining the illustrated embodiment of the invention, it is assumed that the parts are assembled as shown in FIG. 1 with bracket 34 affixed to stationary support 31 and with plate 55 attached to high temperature piping. Under normal conditions, the valves in valve unit V are open and permit free flow of the hydraulic fluid between opposite ends of piston 22 and unrestricted movement of that piston in either direction for all piston velocities up to a predetermined value, such as 10 inches per minute. Normal movement of the piping due to thermal expansion of contraction is usually below this value. At such times as the velocity of piston 20 in either direction attains a velocity greater than 10 inches per minute, due, for example, to the imposition of a shock force on or in the piping, the valves within the valve unit close instantly. This terminates free flow of the hydraulic fluid and converts the arrestor into a rigid strut for so long as the abnormal condition exists. When the condition is alleviated, the valves within the valve unit open automatically thereby again allowing free flow of hydraulic fluid to and from cylinder 10 and unrestricted movement of the piston 20, piston rod 22 and associated parts.

Based on the foregoing, it is believed that the construction, operation, objects and advantages of my present invention will be readily comprehended by persons skilled in the art, without further description. It is to be clearly understood, however, that various changes in the construction described above and illustrated in the draw-

I claim:
1. An arrestor for protecting equipment, such as piping, against shock loading, undesirable vibratory movement and the like, comprising:
   (a) a hydraulic unit including:
       (1) a cylinder having an end wall;
       (2) first bearing means carried by the end wall;
       (3) second bearing means secured to the end wall and spaced from the side of the first bearing means remote from the piston;
       (4) a piston reciprocable in the cylinder;
       (5) a piston rod secured to and reciprocable with the piston, extending through the end wall and supported by both bearing means;
   (b) first coupling means connected to the cylinder;
   (c) second coupling means connected to the piston rod exterior of the cylinder;
       one of the coupling means being adapted to be anchored to a stationary support and the other coupling means being adapted to be connected to the equipment;
   (d) a valve unit communicating with both ends of the cylinder, permitting free flow of hydraulic fluid to and from opposite sides of the piston for piston velocities up to a predetermined value and terminating such flow in response to piston velocities greater than said predetermined value; and
   (e) an accumulator unit mounted on the hydraulic unit, said accumulator unit communicating with the valve unit and being adapted to contain a supply of the hydraulic fluid.

2. An arrestor according to claim 1 wherein the second bearing means comprises:
   (a) a tubular member generally coaxial with the piston rod and connected at one end to the end wall;
   (b) a sleeve bearing at the other end of the tubular member.

3. An arrestor according to claim 2 wherein the second bearing means also comprises:
   (a) a flexible collar surrounding the piston rod and positioned to the side of the sleeve bearing remote from the end wall for imparting a wiping action to the piston rod during reciprocation thereof.

4. An arrestor according to claim 1 wherein the accumulator unit comprises:
   (a) a second cylinder;
   (b) a second piston reciprocable in the second cylinder;
   (c) a rod secured to the second piston and extending through the cylinder; and
   (d) means associated with the rod for visually indicating the position of the second piston in the second cylinder.

5. An arrestor according to claim 4 wherein the indicating means comprises:
   (a) a graduated scale carried by and positioned exterior of the second cylinder.

6. An arrestor according to claim 1 wherein the accumulator unit comprises:
   (a) a second cylinder;
   (b) a second piston reciprocable in and dividing the interior of the second cylinder into a first compartment for containing a supply of the hydraulic fluid and communicating with the valve unit and a second compartment communicating with the atmosphere;
   (c) a rod connected to the second piston and extending through the second compartment and the cylinder; and
   (d) means associated with the rod for visually indicating the position of the second piston in the second cylinder.

7. An arrestor according to claim 6 wherein the indicating means comprises:
   (a) a graduated scale carried by and positioned exterior of the second cylinder.

8. An arrestor according to claim 7 including:
   (a) resilient means within the second compartment biasing the rod inwardly relative to the second cylinder.

9. An arrestor according to claim 1 including:
   (a) spring means within the cylinder for protecting the hydraulic unit against impact of the piston with either end wall of the cylinder.

10. An arrestor according to claim 9 wherein the spring means comprises:
    (a) a disc spring at each end of the cylinder, the disc springs being aligned and the piston rod extending through one of the disc springs.

References Cited

UNITED STATES PATENTS

| 2,323,352 | 7/1943 | Pitts | 188—97 |
| 2,756,989 | 7/1956 | Peras | 267—34 |
| 3,112,909 | 12/1963 | Suozzo | 267—1 |
| 3,173,667 | 3/1965 | Lee | 267—1 |
| 3,302,662 | 2/1967 | Webb | 267—1 |

ARTHUR L. LA POINT, Primary Examiner
DANIEL F. WORTH III, Assistant Examiner

U.S. Cl. X.R.
188—97